July 13, 1965 V. L. PEICKII ETAL 3,194,571

MULTIPLE-LIP SEAL

Original Filed Dec. 15, 1958

3,194,571
MULTIPLE-LIP SEAL

Vasalie L. Peickii, Hillsborough, Andrew M. Seemann, San Jose, and Robert N. Haynie, Mountain View, Calif., assignors to Federal-Mogul-Bower Bearings, Inc., Detroit, Mich., a corporation of Michigan
Continuation of application Ser. No. 780,479, Dec. 15, 1958. This application Jan. 29, 1963, Ser. No. 255,720
9 Claims. (Cl. 277—184)

This application is a continuation of application Serial Number 780,479, filed December 15, 1958, and now abandoned.

This invention relates to an improved multiple-lip seal. More particularly, the invention relates to unitary, i.e., single-molded seals having a plurality of thin wafer-like lips, each of which is generally rectangular in cross-section.

For many years, bearings have been protected from dirt by wafer-like annular seals of the type having a lip with a generally rectangular cross-section. To make multiple-lip seals, a number of these wafers have been stacked together and clamped into an outer case. The use of more than one lip has helped to keep dirt, water, and other foreign matter out of bearings and similar equipment. However, this type of multiple-lip wafer seal has had many disadvantages, in addition to the fact that the method of assembly obviously is cumbersome and expensive, for each lip has been made separately; the outer case has been made separately, and the assembly has been another separate operation.

First, it is not possible to assemble three or more separate lips annd perserve complete concentricity. Yet concentricity between the individual lips and also between the inner periphery of each lip and the outer periphery of the case is very important in order that a multiple-lip seal function properly, for two reasons: (1) Unless concentricity between the lips is maintained, the lips tend to touch each other when they are bent back on the shaft. While touching might be avoided by increasing the spacing between the lips, this would mean increasing the width of the seal, and such an increase is usually forbidden, since the customers cannot provide more space to receive the seal. (2) Unless the lip periphery is concentric with the case periphery, the lip has a "scrubbing" action on a rotating shaft. Such "scrubbing" tends to push dirt under the lip, for the dirt and mud cause rusting and pitting of the shaft just beyond the contact point of the lip and the shaft, and when this pitted area gets carried under the lip during rotation of the shaft, it carries fine dirt with it; the dirt becomes embedded in the rubber and acts as an abrasive, scoring the shaft.

Another problem was that if the assembled stack is not clamped tightly enough, leakage becomes possible between successive wafers or between the wafers and the case. On the other hand, rubber, be it natural or synthetic, is incompressible. This means that when the components are squeezed together to secure them, the hynthetic lips are locally "compressed," displacing the rubber and distorting the free portion of the lip. This distortion may show as wrinkling or a smaller inner periphery (or an increased outer periphery for externally facing lips), and unfortunately the movement is usually irregular due to small inconsistencies in the internal stresses of the material. Thus, even if the component seals were perfectly aligned during assembly, when they were compressed to hold them in place both this alignment and the actual size of the inner periphery are lost. It is difficult to maintain close tolerances, and production can not be consistent and precise.

All these disadvantages of seals that are assembled from a plurality of separate elements are eliminated by the unitary multiple-lip seal of this invention. The cost of performing separate manufacturing operations has been eliminated by a seal structure that is molded in a single operation with as many lips as desired. Concentricity is assured since all the lips are molded simultaneously in the same mold and are attached to each other by an integral body or web. There can be no leakage between elements since the lips are all part of the same body and that body is molded to its case. The variations which occurred from part to part when wafers were assembled—especially when the wafers came from different molds, but also when parts from the same mold were assembled in different orientations—have been eliminated by this invention. Close tolerances are easily maintained, and production is consistent, uniform, and precise.

While oil seals have been made without metal cases, such reinforced rubber seals were only of the light lip contact variety, either with or without a spring; they could sometimes be used for oil or grease sealing, but they were not suitable for heavy-duty dirt exclusion. Unreinforced elastomeric seals tend to become loose in the bore and may easily fall out. They are quite impractical for the wafer-lip type of seal, where it is essential to maintain high contact pressures between the lip and the shaft for maximum efficacy and where, in consequence, the rotating torque is universally high. This both necessitates very secure anchoring of the lips to the outer casing of the seal and requires either a metal-to-metal press fit to the bore or, if a rubber press fit is to be employed, that this be backed up in close proximity with metal.

While a multi-lip wafer seal might theoretically be made by molding all the lips at once in an unreinforced structure and then clamping this molding between a pair of metal cases, such a design would suffer from serious defects. Due to the incompressibility of rubber, as explained earlier, distortion of the lip is inevitably introduced by such clamping, so that all the advantages of concentricity in molding are lost at assembly. Furthermore, when the synthetic material takes a permanent set, the clamped member tends to become loose, and then it ceases to be an effective seal. The present invention provides the only effective answer to the problem by providing a seal in which all the lips are molded in a single unit that is bonded to a metal case so that there is no distortion of the parts after they are removed from the mold.

This invention effects an important reduction in the cost of plural-lip seals, eliminates the assembly of several component parts, and leads to a much more precise product with outstanding performance advantages.

Other objects and advantages of the invention will appear from the following description of some preferred embodiments thereof.

Figure 1:
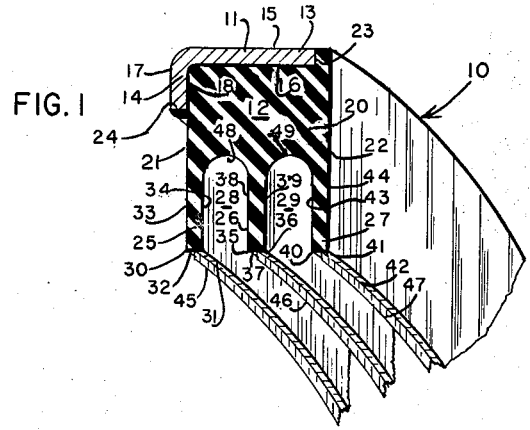
FIG. 1 is a fragmentary view in perspective and partly in section of a portion of one form of seal embodying the principles of the present invention and having three parallel spaced-apart lips, with flash along the center line.

Triple-lip seal of FIG. 1

The fluid seal 10 shown in FIG. 1 is of the type known as a radial shaft seal. It comprises a continuous annular metal case or rigid reinforcing member 11 and a continuous annular elastomeric sealing member 12. The case or reinforcing member 11 has an axially extending flange 13 and a radially extending flange 14. The flange 13 has an outer face 15 adapted to seal in the bore of a housing member, and an inner surface 16. The radial flange 14 has an outer surface 17 and an inner surface 18.

The sealing member 12 is formed of resilient elastomeric material, such as one of the well-known types of oil-resistant synthetic rubber, and comprises a main body or web portion 20 having generally radially extending end faces 21 and 22. The body 20 is bonded to the inner faces 16 and 18 of the case 11, and also to its edges 23 and 24, the portion outside the edge 23 enabling closure of the mold without the mold touching the edge 23. The face 21 may lie substantially flush with the inner face 18 of the radial flange 14, while the face 22 lies axially slightly beyond the edge 23 of the axial flange 13.

The sealing member 12 shown in FIG. 1 has three lips, 25, 26, and 27 separated by annular grooves 28 and 29. Note that the drawings show that the grooves 28 and 29 are much wider than the lips 25, 26, and 27. The lips 25, 26, and 27 are all generally rectangular in cross-section and the closer they are to this shape the better. The lip 25, for example, has sharp edges 30 and 31 defined by a short axially extending portion 32 and truly radial end walls 33 and 34, the radial end wall 33 being a portion of the face 21. Similarly, the central lip 26 has sharp edges 35 and 36 formed by an axial portion 37, which is co-axial with the portion 32, and by truly radial end faces 38 and 39. Again, the lip 27 has sharp edges 40 and 41 formed by a cylindrical portion 42, which is coaxial with and lies along the same cylinder as the portions 32 and 37, and by end faces 43 and 44, the face 44 being a continuation of the face 22.

Figure 2:
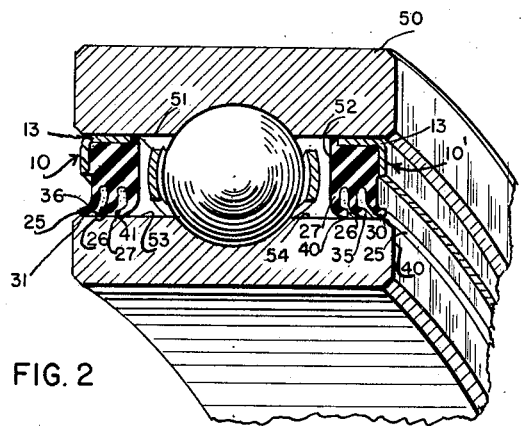
FIG. 2 is a view in elevation and in section of an installation incorporating two seals of FIG. 1, the view being on a smaller scale than FIG. 1.

It is often essential, important, or preferable that there be no flash at all at the sharp edges 30, 31, 35, 36, 40 and 41, for flash of sufficient length could accidentally fold over these sharp edges upon seal installation and interfere with their best operation. According to the present invention, if completely flashless molding is not practical, any flash that may be present is located where it is harmless. In the particular modification now under discussion, the flash is shown confined along the center lines 45, 46 and 47 of the lips 25, 26 and 27. Otherwise, there is no flash on the lips of this particular seal. The flash has been shown and exaggerated somewhat in FIG. 1. It will be noted from FIG. 2, showing the working position of the seal 10, that this location of the flash means that either group of the edges 30, 35 and 40, or 31, 36 and 41 may engage the shaft, and that in either event a little flash on the center lines 45, 46 and 47 of the seal lips is not harmful. The present form of the invention keeps this flash to a minimum and assures that it will be intermediate the two edges rather than along them.

Figure 5:
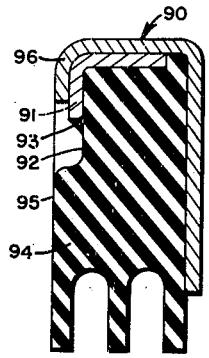
FIG. 5 is a view similar to FIG. 4 of another modified form of seal embodying the principles of the invention.
Figure 4:
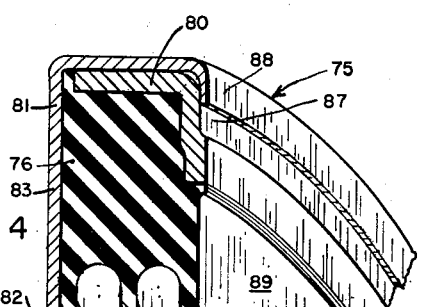
FIG. 4 is another view similar to FIG. 1 of another modified form of seal employing an outer case, the lip portion upon installation being indicated by broken lines.

It will be noted that the present invention eliminates the necessity for an outer case in many instances, although one may be used if desired or where necessary as in FIGS. 4 and 5. Otherwise, the axial flange 13 supports all three lips 25, 26, 27 directly. Furthermore, it will be noted that the cavities 28 and 29 preferably have rounded interior termini 48 and 49, no sharp edges being needed there, and the rounded (i.e., semi-toroidal concave) surface enabling better stripping from the mold. The mold itself is described in U.S. Patent 2,982,997.

Thus, the triple-lip seal 10 of FIG. 1 is a unitary seal with molded-in concentricity, and the three lips 25, 26 and 27 can be made to any accuracy desired. Their relationship is uniform since they are all molded at once. The location of the face 21, while shown in FIG. 1 as actually in line with the inside face 18 of the radial flange 14, may vary therefrom, but preferably does not extend out beyond the face 17.

An installation of two seals 10 (FIG. 2)

FIG. 2 shows two seals 10 and 10′ installed in a ball-bearing assembly 50, between respective bores 51, 52 and cylindrical surfaces 53, 54. The cases 13 engage the bores 51, 52. The lips 25, 26 and 27 of the seal 10 are deflected to place the edges 31, 36 and 41 in contact with the rotating surface 53, but they do not overlap owing to the groove width. In the other seal 10′, the edges 30, 35 and 40 are the sealing edges. This view illustrates that when the flash is limited to the center line, the seal can be installed from either direction. It also illustrates the fact that an outer case is not always necessary in such a seal, whereas all former multiple-lip seals had to have outer cases, since they held the separate wafers together. Seals without outer cases can be used in sealed conveyor bearings, for example.

Figure 3:
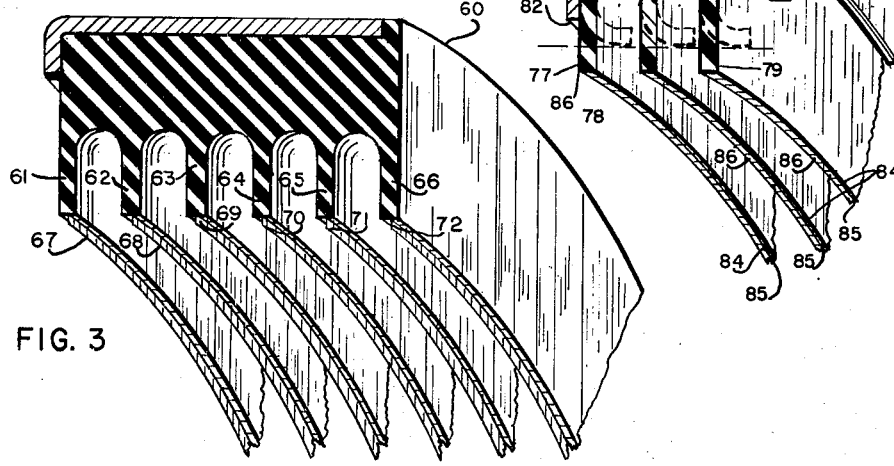
FIG. 3 is a view similar to FIG. 1 of a modified form of a seal also embodying the principles of the invention and having six lips.

A six-lip seal (FIG. 3)

The seal 60 of FIG. 3 is much like the seal 10 of FIG. 1 except that it has six lips instead of three. The present invention makes this possible and also provides that again there be no flash at the edges. In this case, the lips 61, 62, 63, 64, 65 and 66 again are all rectangular in cross-section with sharp edges, and any flash that may be present would be along the center lines 67, 68, 69, 70, 71 and 72. This feature enables accurate sealing.

Another modified form of seal 75 (FIG. 4)

FIG. 4 shows another triple lip seal 75 also embodying the invention. Here, a sealing element 76 with three lips 77, 78 and 79 is bonded to an inner case 80 and the whole is clamped in an outer case 81. Such a combination has advantages in some applications. For example, when seals are installed on the turning shaft of a disk harrow, grass, straw and similar matter can be a problem when the harrow is used to till a field. This stringy matter tends to wrap around the turning shaft and produces a force and a cam-like action tending to force the lips of a seal inwardly where it would fail. The difficulty is solved by using an outer case 81 with a small pierce 82 not much larger than the shaft, for the radial flange 83 of the outer case 81 supports the body 76 of the seal and prevents the lips 77, 78 and 79 from turning inwardly and causing the seal to fail.

FIG. 4 also illustrates an instance where it is preferable to have the flash 84 on the lip edges 85 that do not contact the shaft. This places the flash 84 as far as possible from the shaft-contacting edge 86. Such a location is feasible because when the outer case 81 is to be installed as shown, there is no doubt whatever about the direction of installation of the seal. Whenever that is true, as is often the case, the flash may be confined to the free edge instead of being in the center as FIG. 1. There are advantages to each structure and they are not complete equivalents but, broadly, they both help space the flash away from the sealing lip edge where it can do no harm. The corner location permits somewhat larger flash but is limited to instances where the direction of installation is known in advance.

The seal 75 also illustrates the stepping-in of the inner case 80 to shorten the axial length of the seal 75. The stepped-in portion 87 is the portion gripped by the turned-over end 88 of the outer case. The end wall 89 of the sealing element 76 lies in between the faces of the inner case 80 and substantially flush with the turned-over end 88.

A further seal modification (FIG. 5)

A seal 90 is shown in FIG. 5 wherein the stepping of the inner case 91 is still greater and wherein a groove 92 lies between a portion 93 of the sealing element 94 and a portion 95. The portion 93 is bonded to the edge of the case 91. The portion 95 extends axially beyond the inner case 91 and is flush with the outer case 96. Otherwise, the seal 90 is like the seal 75 in its broad consideration. The groove 92 mainly serves to protect the bond of the sealing element 94 to the inner case 91 at the edge, where flush molding without the groove could tend to part the bond during stripping of the seal from the mold. It is also useful in preventing flash at the junction of the metal and rubber and of course presents a product advantage where narrow seals are needed, since the minimum axial width becomes possible even though an outer case is used.

Where no outer case is to be used, the mold structure is reversed to locate the flash on the opposite sides of the lips from the inner case.

To those skilled in the art to which this invention relates, many additional changes in construction and widely differing embodiments of the invention will suggest themselves without departing from the spirit and scope of the invention as defined in the claims.

What is claimed is:

1. A multiple-lip radial-type single-molded unitary annular seal for installation between two relatively rotating machine parts for retaining lubricant on one side of said seal and excluding the entry of dirt and other foreign matter from the other side of said seal, comprising
a rigid, closed, continuous annular metal reinforcing member having one cylindrical wall for engaging one of said two machine parts, and
an integral, annular, continuous unitary synthetic rubber, lubricant-resistant elastomer molded and bonded to a second cylindrical wall of said reinforcing member and having at least three coaxial radial lips for engaging the other of said two machine parts,
said lips being of identical periphery, each being rectangular in cross-section and with at least one edge sharp, sharp lip edges being on the same side of all lips for engagement of said other machine parts upon installation of said seal with flexure of said lips toward the side from which dirt might enter,
concentricity of parts and proper support and dimensional tolerances being assured by the integrality of the reinforcing member and the unitary elastomeric member,
said lips being spaced apart axially by radial grooves that are sufficiently wider than said lips, so that the lips can be flattened at their ends with marginal portions of the radial lips extending axially without touching one another, said grooves having rounded concave terminal surfaces that are semi-toroidal, to avoid corners and thereby enable mold removal without tearing said surfaces.

2. The seal of claim 1 wherein both edges of each said lip are sharp, so that the seal can be installed in either direction.

3. A precision-molded, multiple-lip, single-molded, unitary, annular, radial-type shaft seal, comprising
a rigid, continuous, closed annular reinforcing metal member having a cylindrical portion with a generally radial portion at one end, said cylindrical portion having first and second cylindrical surfaces on opposite sides thereof, and
an integral annular synthetic rubber, lubricant-resistant elastomeric member molded to said reinforcing member and bonded to both said first surface of said cylindrical portion and said radial portion,
said elastomeric member having a multiplicity of axially spaced apart integral lips projecting radially from said reinforcing member in the same direction as said radial portion, said radial portion being partially embedded in said elastomeric member,
all said lips being coaxial and of identical periphery, each lip being rectangular in cross-section before installation of the seal between two relatively rotating machine parts and having a sharp sealing edge, said sealing edge being on the same side of all the lips,
all said lips being of substantially identical, wafer-thin axial thickness, and much narrower than the axial spacing between said lips for flexure upon installation between said machine parts to a flattened axially-extending shape at marginal radial portions of each lip end, so that said sealing edges are put into sealing engagement with one said machine part while said second surface of said cylindrical portion of said reinforcing member engages the other said machine part in a sealing fit.

4. A multiple-lip lubricant-retaining and dirt-excluding rotating single-molded unitary annular shaft seal comprising
a rigid closed annular reinforcing metal member having a cylindrical portion with a radial portion at one end and an edge at the other end, said radial portion extending radially inwardly to a circular rim, both portions having inner and outer surfaces, the outer surface of said cylindrical portion being adapted to engage a bore wall in a press fit, and
an integral annular synthetic rubber lubricant-resistant elastomeric member molded and bonded to the inner wall surfaces of both said cylindrical and radial portions and to said edge and to said rim, and having radial end faces, a first one substantially in line with the inner surface of said radial portion and a second one slightly beyond said edge,
said elastomeric member also having a plurality of wafer-thin annular lips, each rectangular in cross-section and projecting radially inwardly from said reinforcing member and beyond said rim, all said lips being coaxial and of identical periphery and having a sharp sealing edge, said sealing edges being on the same side af each lip, said grooves having rounded interior termini in said elastomeric member, said lips being spaced apart axially from each other by grooves that are sufficiently wider than said lips so that said lips are able to be flexed so that marginal radial portions extend axially at their free ends when sealing, without touching each other.

5. A multiple-lip radial-type single-molded unitary annular seal for installation between two relatively rotating machine parts, namely, a bore and a shaft, for retaining lubricant on one side of said seal and excluding the entry of dirt and other foreign matter from the other side of said seal, comprising
a rigid, closed, continuous annular reinforcing metal member having a cylindrical wall with an outer surface for engaging said bore and a generally radially inwardly extending portion on one end, and
an integral, annular, continuous synthetic rubber, lubricant-resistant elastomeric member molded and bonded to the radially inward side of said cylindrical wall and to said generally radially extending portion and having at least three coaxial radial lips for engaging said shaft, said lips being coaxial and of identical periphery, each being rectangular in cross-section and with at least one edge sharp, sharp lip edges being on the same side of all lips for engagement of said shaft upon installation of said seal with flexure of said lips at marginal radial portions, said lips being spaced apart axially by grooves with rounded termini, said grooves being substantially wider than said lips, said elastomeric member having one end face substantially in line with the inner surface of said generally radially inwardly extending portion and providing the radial side wall of one said lip, said elastomeric member having another end face lying beyond the other end of said cylindrical portion and bonded to its edge and forming the radial side wall of another said lip.

6. A multiple-lip radial-type seal for installation between two relatively rotating machine parts, namely, a shaft and a bore, for retaining lubricant on one side of said seal and excluding the entry of dirt and other foreign matter from the other side of said seal, comprising a rigid, closed, continuous annular metal reinforcing member having a cylindrical wall for engaging said bore and a generally radially extending portion on one end terminating in a circular rim, and an integral, annular, continuous synthetic rubber, lubricant-resistant elastomeric member molded and bonded to the radially inner side of said cylindrical wall and to said generally radially inwardly extending portion and to said rim and having at least three coaxial radial lips for engaging said shaft, said lips being of identical periphery, each being rectangular in cross-section and with at least one edge sharp, sharp lip edges being on the same side of all lips for engagement of said shaft upon installation of said seal with flexure of said lips, said lips being spaced apart axially by radial grooves that are substantially wider than said lips and that terminate at said elastomeric member in a concave semi-toroidal surface to avoid mold tearing corners, said elastomeric member having one face axially beyond the inner surface of said generally radially inwardly extending portion and an annular groove radially inwardly of said rim and extending axially inwardly to a point substantially in line radially with said inner surface, dividing a bonding portion at said rim from a radially inner portion constituting the radial side wall of one said lip, said elastomeric member having another end face lying beyond the other end of said cylindrical portion and covering its edge and forming the radial side wall of another said lip.

7. The seal of claim 6 wherein both edges of each said lip are sharp, so that the seal can be installed in either direction.

8. A triple-lip radial-type seal for installation between two relatively rotating machine parts, namely, a shaft and a bore, for retaining lubricant on one side of said seal and excluding the entry of dirt and other foreign matter from the other side of said seal, comprising a rigid, closed, continuous annular reinforcing member having a cylindrical wall for engaging said bore and a generally radially extending portion on one end terminating in a circular rim, an integral, annular, continuous elastomeric member molded and bonded to the radially inner side of said cylindrical wall and to said generally radially inwardly extending portion and to said rim and having three coaxial radial lips for engaging said shaft, said lips being of identical periphery, each being rectangular in cross-section and with at least one edge sharp, the sharp lip edges being on the same side of all lips for engagement of said shaft upon installation of said seal with flexure of said lips, said elastomeric member having one face axially beyond the inner surface of said generally radially inwardly extending portion and an annular groove radially inwardly of said rim and extending axially inwardly to a point substantially in line radially with said inner surface, dividing a bonding portion at said rim from a radially inner portion constituting the radial side wall of an outer-located said lip, said elastomeric member having a second end face lying beyond the other end of said cylindrical portion and covering its edge and forming the radial side wall of an inner-located said lip, and an outer case with a cylindrical portion snug against the outer surface of said cylindrical wall of said reinforcing member, a radial portion at the opposite end of said seal from the radially extending portion of said reinforcing member in snug contact with said second end face of said elastomeric member and extending radially inwardly well beyond said rim to an inner pierce very slightly larger than the element which the seal lips are to seal against, thereby affording direct support for said inner-located lip, and a locking portion clamped against said radially extending portion of said reinforcing member, said sharp edges of each of said lips lying in each instance on the side of said lip closer to the radial portion of said outer case, said lips on installation being flexed away from said radial portion of said outer case, whereby said outer case backs up said lips and supports them from being forced by external forces through to a position where they are flexed in a direction opposite to that in which they are flexed during their installation.

9. A multiple-lip lubricant retaining and dirt-excluding rotating shaft seal comprising a rigid closed annular reinforcing member having a cylindrical portion with a radial portion at one end and an edge at the other end, said radial portion extending radially inwardly to a circular rim, both portions having inner and outer surfaces, the outer surface of said cylindrical portion being adapted to engage a bore wall in a press fit, an integral annular elastomeric member molded and bonded to the inner wall surfaces of both said cylindrical and radial portions and to said edge and to said rim, and having radial end faces, a first one substantially in line with the inner surface of said radial portion, and a second one slightly beyond said edge, said elastomeric member also having a plurality of wafer-thin annular lips, each rectangular in cross-section and projecting radially inwardly from said reinforcing member and beyond said rim, all said lips being coaxial and of identical periphery and having a sharp sealing edge, said sealing edges being on the same side of each lip, said lips being spaced apart axially from each other by grooves that are substantially wider than said lips, said grooves having rounded interior termini in said elastomeric member, and an outer case with a cylindrical portion snug against the outer surface of said cylindrical portion of said reinforcing member, a radial portion at the opposite end of said seal from the radial portion of said reinforcing member in snug contact with said second face of said elastomeric member and extending radially inwardly well beyond said rim to an inner pierce very slightly larger than the element which the seal lips are to seal against, thereby affording direct support for one of said lips, and a locking portion clamped against said radial portion of said reinforcing member, said sharp edges of each of said lips lying in each instance on the side of said lip closer to the radial portion of said outer case, said lips on installation being flexed away from said radial portion of said outer case, whereby said outer case backs up said lips and supports them from being forced by external forces through to a position where they are flexed in a direction opposite to that in which they are flexed during their installation.

References Cited by the Examiner

UNITED STATES PATENTS

| | | | |
|---|---|---|---|
| 2,172,325 | 9/39 | Victor et al. | 277—227 X |
| 2,547,257 | 4/51 | Cole | 277—182 |
| 2,992,027 | 7/61 | Wright et al. | 277—153 X |
| 3,049,357 | 8/62 | Kosatka | 277—208 X |

FOREIGN PATENTS

| | | |
|---|---|---|
| 545,437 | 5/42 | Great Britain. |

LEWIS J. LENNY, *Primary Examiner.*

SAMUEL ROTHBERG, EDWARD V. BENHAM, *Examiners.*